United States Patent
Fendt

(10) Patent No.: US 11,887,415 B2
(45) Date of Patent: Jan. 30, 2024

(54) METHOD FOR MONITORING THE POSITION OF A CONNECTION CABLE OF A TRAILER, A CAMERA SYSTEM FOR MONITORING THE POSITION OF A CONNECTION CABLE OF A TRAILER AND A MOTOR VEHICLE HAVING A CAMERA SYSTEM

(71) Applicant: Conti Temic microelectronic GmbH, Nuremberg (DE)

(72) Inventor: Günter Anton Fendt, Schrobenhausen (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 361 days.

(21) Appl. No.: 17/310,161

(22) PCT Filed: Dec. 4, 2019

(86) PCT No.: PCT/DE2019/200142
§ 371 (c)(1),
(2) Date: Jul. 22, 2021

(87) PCT Pub. No.: WO2020/151778
PCT Pub. Date: Jul. 30, 2020

(65) Prior Publication Data
US 2022/0130186 A1    Apr. 28, 2022

(30) Foreign Application Priority Data

Jan. 22, 2019   (DE) .................... 10 2019 200 748.1

(51) Int. Cl.
*G07C 5/08* (2006.01)
*G06T 7/73* (2017.01)
(Continued)

(52) U.S. Cl.
CPC .............. *G07C 5/0816* (2013.01); *G06T 7/74* (2017.01); *G06V 20/56* (2022.01); *H04N 7/18* (2013.01);
(Continued)

(58) Field of Classification Search
CPC ................... G07C 5/0816; G06T 7/74; G06T 2207/30252; G06V 20/56; H04N 7/18; B60R 1/26; B60R 2300/30
(Continued)

(56) References Cited

U.S. PATENT DOCUMENTS

2013/0261843 A1   10/2013  Baudisch
2015/0314661 A1*  11/2015  Erdtman ............. B60R 16/0215
                                                                 248/65
(Continued)

FOREIGN PATENT DOCUMENTS

DE        1752301 U       9/1957
DE        20012178        9/2000
(Continued)

OTHER PUBLICATIONS

German Search Report dated Sep. 10, 2019 for the counterpart German Patent Application No. 10 2019 200 748.1.
(Continued)

*Primary Examiner* — Naomi J Small

(57) ABSTRACT

An example embodiment of the present disclosure relates to a method for monitoring the position of a connection cable of a trailer, having the steps of:
  capturing a region which lies behind a motor vehicle using a camera,
  processing the captured image data using an analysis unit, detecting the connection cable, and determining the position of the connection cable,
  comparing the captured position of the connection cable with a secure position of the connection cable,
(Continued)

and outputting a warning signal if the captured position of the connection cable deviates from the secure position. Another example embodiment additionally relates to a camera system and to a motor vehicle including a camera system.

13 Claims, 2 Drawing Sheets

(51) Int. Cl.
    *G06V 20/56* (2022.01)
    *H04N 7/18* (2006.01)
    *B60R 1/26* (2022.01)

(52) U.S. Cl.
    CPC ............. *B60R 1/26* (2022.01); *B60R 2300/30* (2013.01); *G06T 2207/30252* (2013.01)

(58) Field of Classification Search
    USPC ......................................................... 340/431
    See application file for complete search history.

(56) References Cited

U.S. PATENT DOCUMENTS

| | | | |
|---|---|---|---|
| 2019/0065931 A1* | 2/2019 | Ward | B60D 1/62 |
| 2019/0164333 A1* | 5/2019 | Fukushima | B60R 1/00 |

FOREIGN PATENT DOCUMENTS

| | | |
|---|---|---|
| DE | 20100324 U1 | 5/2001 |
| DE | 112014004554 T5 | 7/2016 |
| EP | 2620326 A1 | 7/2013 |
| EP | 2648950 A1 | 10/2013 |
| EP | 3260334 A1 | 12/2017 |

OTHER PUBLICATIONS

International Search Report and the Written Opinion of the International Searching Authority dated Feb. 25, 2020 for the counterpart PCT Application No. PCT/DE2019/200142.

* cited by examiner ately, the process of attaching a trailer is not a routine operation, meaning that errors are made a great many times, which can be associated with dire consequences.

METHOD FOR MONITORING THE POSITION OF A CONNECTION CABLE OF A TRAILER, A CAMERA SYSTEM FOR MONITORING THE POSITION OF A CONNECTION CABLE OF A TRAILER AND A MOTOR VEHICLE HAVING A CAMERA SYSTEM

CROSS REFERENCE TO RELATED APPLICATIONS

This application is a National Stage Application under 35 U.S.C. 371 of International Application No. PCT/DE2019/200142 filed on Dec. 4, 2019, which claims priority from DE 10 2019 200 748.1, filed on Jan. 22, 2019, the disclosures of which are herein incorporated by reference in their entireties.

FIELD OF INVENTION

The invention relates to a method for monitoring the position of a connection cable of a trailer, a camera system for monitoring the position of a connection cable of a trailer and a motor vehicle having a camera system.

BACKGROUND

Nowadays, it is difficult to imagine motor vehicles without driver assistance systems. Driver assistance systems have functions which support the driver of a vehicle while driving. This is in particular achieved in that the system captures or records the environment, processes the captured information and then performs corresponding driving maneuvers or reproduces the environmental information for the driver. In particular, cameras which capture at least certain areas of the space around the vehicle are deployed for this. For example, front cameras which are arranged in the region of the windshield and capture a region in front of the vehicle are known. In the meantime, backwards-looking cameras, such as reversing cameras, are now additionally part of the prior art. In particular, these capture a region which lies behind the vehicle. Surround-view systems are also increasingly being deployed.

Although today's motor vehicles increasingly have trailer hitches, towing trailers is not commonplace. One known utilization of trailers is transporting large items of furniture, in particular when moving into a house. Trailers are additionally deployed in the form of motorhomes. The trailer is only used for these purposes occasionally, so a certain amount of time can elapse between each utilization of the trailer. Consequently, the process of attaching a trailer is not a routine operation, meaning that errors are made a great many times, which can be associated with dire consequences.

To ensure that the following motor vehicles can continue to be informed about the state of the trailer-towing ego motor vehicle when utilizing trailers, there must be a connection between the ego motor vehicle and trailer. This usually takes the form of a cable. In particular, the cable ensures that the following motor vehicles can still detect the driving maneuver of the ego motor vehicle despite the trailer. The braking pulses can additionally be transferred by the cable to the trailer. If the cable is not properly assembled, the cable can slip, in the worst case it can detach completely during the operation of the trailer combination in particular due to bumps in the roadway. This can damage the connection cable or, in the worst case, this can lead to a traffic hazard.

SUMMARY

Starting from this, it is now an object to provide a method or a system with which a trailer can be towed securely and, in particular, without any accidents.

According to a first aspect, an example embodiment relates to a method for monitoring the position of a connection cable of a trailer having the steps of:
  capturing a region which lies behind a motor vehicle using a camera,
  processing the captured image data using an analysis unit, detecting the connection cable and determining the position of the connection cable,
  comparing the captured position of the connection cable with a secure position of the connection cable,
  outputting a warning signal if the captured position of the connection cable deviates from the secure position.

In particular, the method according to the example embodiment ensures that the position of a connection cable of a trailer is monitored, such as continually during a journey. If the position of the connection cable changes, then the driver is informed about this. The driver can thus take appropriate measures before an accident risk arises or before the connection cable is damaged. The driver can, for example, stop the motor vehicle and reattach the connection cable. The overall result is that a trailer can be towed securely.

The connection cable is in particular detected with an object detection method which is known in image processing.

The warning signal can be output optically and/or acoustically. It is advantageous if the driver is informed about the position of the connection cable on a display device, in particular on a monitor and/or a head-up display. It is advantageous if at least an image detail of the camera is represented to the driver, wherein overlays or highlightings, which are in particular configured in color, are inserted if the position of the connection cable deviates from the secure position. This ensures that the driver is informed in a simple and easily recognizable manner about an incorrect position of the connection cable.

It is conceivable that a multi-stage warning can be effected. If the connection cable only deviates marginally from the secure position, an alternating sound or an alternating beeping can be effected. If the position of the connection cable deviates more and more from the secure position, the acoustic signal can be converted into a continuous sound or continuous beeping. Likewise, the optical warning can change, in particular it can change color. The highlighting or overlay can change color. The color particularly changes from yellow to orange to red.

In an example configuration, the warning signal is only output if a distance or a difference exists between the captured position of the connection cable and the secure position, which exceeds a threshold.

A secure position within the meaning of the example embodiment is in particular understood to be a position of the connection cable, in which there should not be any damage to the connection cable during the operation of the motor vehicle. The connection cable is in particular located in the secure position if it is arranged at a sufficient distance from the roadway. In an advantageous configuration of the example embodiment, the secure position is a defined distance between the connection cable in the secure position, in particular in a nominal position, and the roadway. Within the meaning of the example embodiment, the defined distance is in particular viewed as a nominal distance. The nominal distance may be stored.

In an advantageous configuration, the smallest distance which the connection cable is from the roadway is in particular determined as the captured distance of the connection cable.

In a configuration, a warning signal is output if the distance of the captured connection cable from the roadway is smaller than the defined distance. It is advantageous if the warning signal is only output if the distance of the captured connection cable deviates from the defined distance by a threshold or a difference. The threshold may be stored in the system. In this case, it is advantageous that the driver does not receive a warning for even the tiniest deviation, even though there is no potential risk.

The secure distance of the connection cable and/or the nominal distance and/or the threshold is/are stored in a storage unit and can be called up.

It is advantageous if it is checked whether a trailer is present. The check can be effected using a camera, in particular a reversing camera, by analyzing an electrical contacting and/or using trailer hitch bearing load detection. If a trailer has been detected, the camera is then in particular activated.

The method according to the example embodiment(s) is only performed if the motor vehicle is moving. It is also possible that the method is activated if the engine of the motor vehicle is started.

According to a second aspect, the example embodiment(s) relates to a camera system for monitoring the position of a connection cable of a trailer, including at least one camera which captures a region which lies behind a motor vehicle; an analysis unit for processing the captured image data, wherein the analysis unit is configured in such a manner that the connection cable is detected and a position of the connection cable is determined; a comparison device which is configured in such a manner that the captured position of the connection cable is compared with a secure position of the connection cable; and a warning device for outputting a warning signal if the captured position of the connection cable deviates from the secure position.

In particular, the system according to the example embodiment(s) ensures that a trailer is towed securely. Even those persons who only tow a trailer intermittently can be spared unnecessary annoyance with the system.

In a configuration, the system can include a storage unit. The secure position and/or a nominal distance and/or a threshold is/are stored in the storage unit. The storage unit can be part of the analysis unit. It is also conceivable that the comparison unit is part of the analysis unit.

The camera is advantageously a reversing camera. This creates added value for the driver since a camera which is already present on the motor vehicle and only has a very limited range of functions acquires an additional function. It is, however, also in principle possible that the camera is a camera from a surround-view system which is in particular arranged in a rear section of the motor vehicle.

The camera system according to the example embodiment(s) is in particular suitable for performing a method according to the example embodiment(s).

According to a third aspect, the example embodiment(s) relates to a motor vehicle having a camera system.

BRIEF DESCRIPTION OF THE DRAWINGS

Further advantageous configurations are set out in the drawings, wherein.

DETAILED DESCRIPTION

Figure 1:
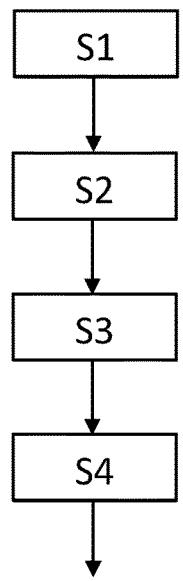
FIG. 1 shows a schematic representation of a flow chart of a method according to the example embodiment(s) for monitoring the position of a connection cable of a trailer in a configuration.

FIG. 1 shows a schematic representation of a flow chart of a method according to the example embodiment(s) for monitoring the position of a connection cable 18 of a trailer 16 in a configuration. In a first step S1, a region which lies behind a motor vehicle 12 is captured using a camera 14. In a second step S2, the captured image data of the camera 14 are analyzed using an analysis unit 22. The connection cable 18 is detected and the position of the connection cable 18 is determined. In order to detect the connection cable 18, known object detection methods can be enlisted. During the determination of the position of the connection cable 18, the smallest distance between the connection cable 18 and a roadway 30 is in particular determined. In a third step S3, the captured position of the connection cable 18 is compared with a secure position of the connection cable 18. The secure position can be a distance between the connection cable 18 in a secure position, in particular in a nominal position, and the roadway 30. The distance is stored in a storage unit 28. In a fourth step S4, a warning signal is output if the captured position of the connection cable 18 deviates from the secure position. The warning signal may be only output if the distance of the captured connection cable 18 from the roadway 30 is smaller than the nominal distance and deviates from the secure distance by a threshold.

Figure 2:
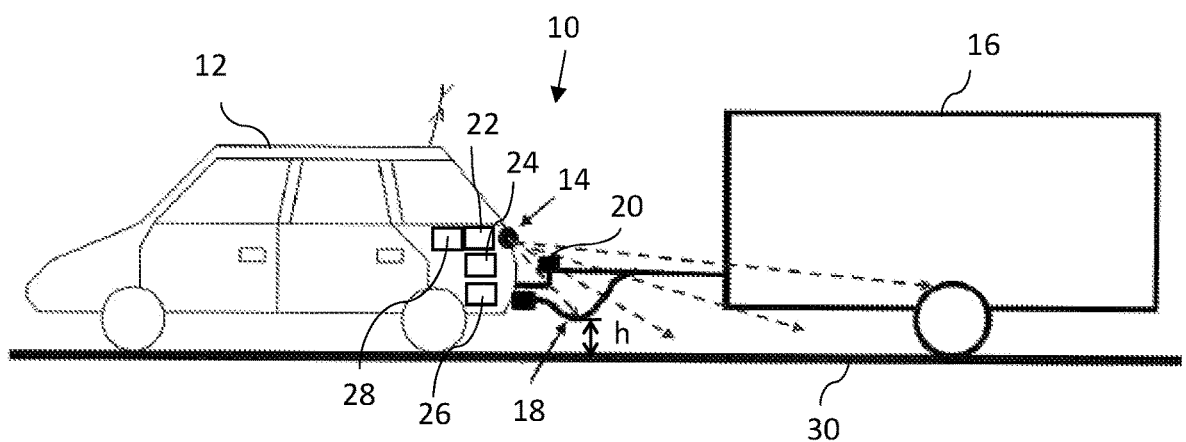
FIG. 2 shows a schematic representation of a motor vehicle including a camera system according to the example embodiment(s) in a configuration, wherein a connection cable is located in a secure position.

FIG. 2 shows a schematic representation of a motor vehicle 12 including a camera system 10 according to the invention for monitoring the position of a connection cable 18 of a trailer 16 in a configuration. The camera system 10 has a camera 14 which captures a region which lies behind a motor vehicle 12. The capturing region of the camera 14 is depicted in FIG. 2 by the dashed arrows. The camera system 10 additionally has an analysis unit 22. The analysis unit 22 processes the captured image data. As a result, the connection cable 18 can be detected and its position can be determined. The smallest distance of the connection cable 18 from the roadway 30 may be determined. The system 10 additionally includes a comparison device 24. The comparison device 24 compares the captured position of the connection cable 18 with a secure position of the connection cable 18. The secure position of the connection cable 18 may be stored in a storage unit 28. Moreover, the system 10 includes a warning device 26 for outputting a warning signal if the captured position of the connection cable 18 deviates from the secure position.

In FIG. 2, the captured connection cable 18 is a distance h from the roadway 30. The distance substantially corresponds to a nominal distance stored in the storage unit 28. Consequently, there is no risk due to the connection cable 18 during the operation of the motor vehicle 12 so that no warning is emitted.

Figure 3:
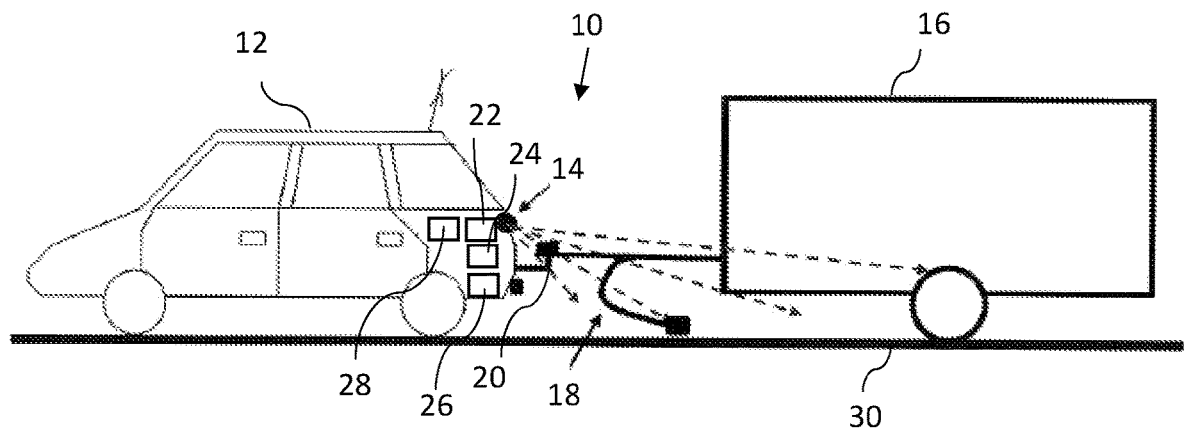
FIG. 3 shows a schematic representation of a motor vehicle including a camera system according to the example embodiment(s) in a configuration, wherein a connection cable is located in a position deviating from a secure position.

FIG. 3 shows a schematic representation of a motor vehicle 12 including a camera system 10 according to the example embodiment(s) in a further configuration. The system 10 depicted in FIG. 3 fundamentally corresponds to the system 10 depicted in FIG. 2. It is merely the position of the connection cable 18 that differs from one another. In FIG. 3, the connection cable 18 has become detached from a contacting of the motor vehicle 12 and is consequently lying on the roadway 30. The distance of the connection cable 18 from the roadway 30 is consequently substantially zero and is consequently smaller than the stored nominal distance. The warning device 26 consequently outputs a warning signal.

Figure 4:
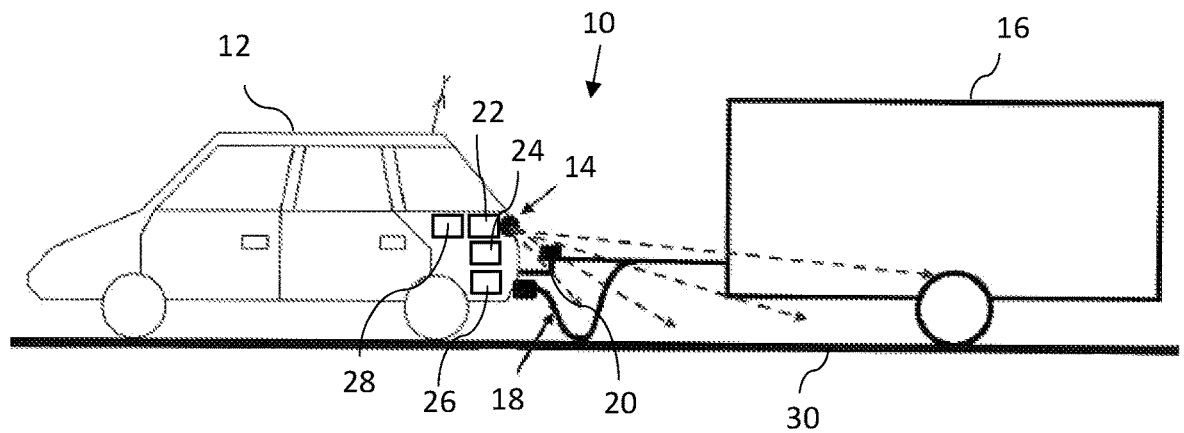
FIG. 4 shows a schematic representation of a motor vehicle including a camera system according to the example embodiment(s) in a further configuration, wherein a connection cable is located in a position deviating from a secure position.

FIG. 4 shows a schematic representation of a motor vehicle 12 including a camera system 10 according to the example embodiment(s) in yet another configuration. The system 10 depicted in FIG. 4 fundamentally corresponds to the systems 10 depicted in FIGS. 2 and 3. It is merely the position of the connection cable 18 that differs from one another. In FIG. 4, the connection cable 18 is sagging in such a manner that it is touching the roadway 30. The distance from the roadway 30 is therefore substantially zero and is consequently smaller than the stored nominal distance. The warning device 26 consequently outputs a warning signal.

The invention has been described above with reference to example embodiments. It is understood that numerous alterations and modifications are possible, without departing from the scope of protection defined by the claims. A combination of the various example embodiments is also possible.

LIST OF REFERENCE NUMERALS

10 Camera system
12 Motor vehicle
14 Reversing camera
16 Trailer
18 Connection cable
20 Trailer hitch
22 Analysis unit
24 Comparison device
26 Warning device
28 Storage unit
30 Roadway
h Distance of the connection cable from the roadway
S1-S4 Method steps

The invention claimed is:

1. A method for monitoring the position of a connection cable of a trailer comprising:
capturing a region which lies behind a motor vehicle using at least one camera and creating captured image data from the captured region,
processing the captured image data using an analysis unit, detecting the connection cable, and determining a position of the connection cable,
comparing the determined position of the connection cable with a secure position of the connection cable,
and outputting a warning signal if the determined position of the connection cable deviates from the secure position.

2. The method according to claim 1, wherein the secure position is a defined distance between the connection cable and a roadway on which the trailer is disposed.

3. The method according to claim 2, wherein the warning signal is output if the distance of the captured connection cable from the roadway is smaller than the defined distance.

4. The method according to claim 1, further comprising storing the secure position of the connection cable in a storage unit.

5. The method according to claim 1, further comprising checking whether the trailer is present.

6. A camera system for monitoring the position of the connection cable of the trailer, in particular for performing a method according to claim 1, comprising the at least one camera which captures the region which lies behind the motor vehicle, an analysis unit for processing the captured image data, wherein the analysis unit is configured in such a manner that the connection cable is detected and the position of the connection cable is determined, a comparison device which is configured in such a manner that the determined position of the connection cable is compared with the secure position of the connection cable, and a warning device for outputting the warning signal if the determined position of the connection cable deviates from the secure position.

7. The camera system according to claim 6, further comprising a storage unit, in which the secure position, in particular a nominal distance between the connection cable and the roadway, is stored.

8. The camera system according to claim 6, wherein the camera is a reversing camera.

9. A motor vehicle having a camera system according to claim 6.

10. A camera system for monitoring the position of a connection cable of a trailer, comprising:
at least one camera which captures a region which lies behind a motor vehicle and generates captured image data;
an analysis unit which receives the captured image data from the at least one camera and is configured in such a manner to detect the connection cable and determine a position of the connection cable based upon the captured image data;
a comparison device which receives the determined position of the connection cable from the analysis unit and is configured in such a manner that the determined position of the connection cable is compared with a secure position of the connection cable; and
a warning device which, based upon the comparison, provides a warning signal if the determined position of the connection cable deviates from the secure position.

11. The camera system according to claim 10, further comprising memory in which the secure position is stored.

12. The camera system according to claim 10, wherein the secured position comprises a nominal distance between the jockey wheel and a ground surface on which the trailer is disposed.

13. The camera system according to claim 10, wherein the at least one camera comprises at least one reversing camera.

* * * * *